United States Patent
Jung et al.

(10) Patent No.: US 7,537,189 B2
(45) Date of Patent: May 26, 2009

(54) SUPPORTING APPARATUS FOR DISPLAY DEVICE

(75) Inventors: Yu Young Jung, Gyeongsangbook-do (KR); Chan Han Kim, Goomi-si (KR)

(73) Assignee: LG Electronics Inc., Seoul (KR)

( * ) Notice: Subject to any disclaimer, the term of this patent is extended or adjusted under 35 U.S.C. 154(b) by 13 days.

(21) Appl. No.: 11/481,054

(22) Filed: Jul. 6, 2006

(65) Prior Publication Data

US 2007/0007413 A1    Jan. 11, 2007

(30) Foreign Application Priority Data

Jul. 8, 2005    (KR) ...................... 10-2005-0061761

(51) Int. Cl.
*A47F 5/00* (2006.01)
(52) U.S. Cl. ................. 248/298.1; 248/284.1; 248/917; 248/919; 248/920; 248/281.11; 361/681
(58) Field of Classification Search ............. 248/284.1, 248/298.1, 281.11, 917, 919, 920; 361/681
See application file for complete search history.

(56) References Cited

U.S. PATENT DOCUMENTS

| | | | |
|---|---|---|---|
| 6,554,242 B2 * | 4/2003 | Kim ........................... 248/371 |
| 6,604,722 B1 * | 8/2003 | Tan ........................... 248/276.1 |
| 6,886,701 B2 * | 5/2005 | Hong et al. .................... 211/99 |
| 6,905,101 B1 * | 6/2005 | Dittmer ...................... 248/274.1 |
| 6,923,413 B2 * | 8/2005 | Dozier ........................ 248/294.1 |
| 7,063,295 B2 * | 6/2006 | Kwon ......................... 248/276.1 |
| 7,070,156 B2 * | 7/2006 | Liao ............................. 248/466 |
| 7,090,182 B2 * | 8/2006 | O'Neill .................. 248/289.11 |
| 7,097,143 B2 * | 8/2006 | Kim et al. ..................... 248/201 |
| 7,152,836 B2 * | 12/2006 | Pfister et al. ........... 248/292.14 |
| 7,175,146 B2 * | 2/2007 | Kim ........................... 248/279.1 |
| 2002/0033436 A1 * | 3/2002 | Peng et al. ................ 248/284.1 |
| 2002/0179791 A1 * | 12/2002 | Kwon ........................ 248/284.1 |
| 2003/0141425 A1 * | 7/2003 | Obdeijn ...................... 248/317 |
| 2005/0035253 A1 * | 2/2005 | Rixom ........................ 248/284.1 |
| 2005/0092890 A1 * | 5/2005 | Liao ............................. 248/466 |
| 2005/0152102 A1 * | 7/2005 | Shin ............................ 361/681 |
| 2005/0167549 A1 * | 8/2005 | Ligertwood ............... 248/122.1 |
| 2005/0236543 A1 * | 10/2005 | O'Neil ...................... 248/286.1 |
| 2005/0242254 A1 * | 11/2005 | Dozier ....................... 248/284.1 |
| 2006/0231711 A1 * | 10/2006 | Shin .......................... 248/291.1 |
| 2006/0291152 A1 * | 12/2006 | Bremmon ................... 361/681 |
| 2007/0023593 A1 * | 2/2007 | Fedewa ....................... 248/201 |

* cited by examiner

*Primary Examiner*—J. Allen Shriver, II
*Assistant Examiner*—Michael McDuffie
(74) *Attorney, Agent, or Firm*—Birch, Stewart, Kolasch & Birch, LLP

(57) ABSTRACT

A supporting apparatus for a display device is provided. The apparatus includes a hanger assembly and a supporter assembly. The hanger assembly allows an upper side and a lower side of the display device to move back and forth with the display device fixed. The supporter assembly on which the hanger assembly is mounted and whose horizontal width is controlled to adjust a position of the hanger assembly.

19 Claims, 10 Drawing Sheets

SUPPORTING APPARATUS FOR DISPLAY DEVICE

BACKGROUND OF THE INVENTION

1. Field of the Invention

The present invention relates to a supporting apparatus for a display device, and more particularly, to a supporting apparatus for a display device, in which a rotational angle and direction of the display device attached on a wall surface are freely set, and allowing all kinds of display devices to be mounted regardless of their standards.

2. Description of the Related Art

Generally, display devices include televisions (TVs) and computer monitors. Recently, a TV monitor has a flat shape as in plasma display panels (PDPs) and liquid crystal display devices (LCDs), and is manufactured in a much greater size than those of general cathode ray tubes (CRTs). Current trend is to increase utility of an indoor space and allow a display device to be installed at a position suitable for the height of a viewer's eye by mounting the display device on a wall surface. In accordance with this trend, various adjusting apparatuses have emerged to allow free adjustment of a display device's angel mounted on a wall surface. With these adjusting apparatuses, it is possible to provide an optimized screen even when a viewer is located in a lower portion at a predetermined angel from the front side of the display device.

Various kinds of angle adjusting apparatuses for a display device are currently sold in the market, but related art angle adjusting apparatuses are heavy and have a large volume in order to support a large-sized display device. Also, there is a limitation in adjusting an angle of a display device attached on a wall surface. In other words, according to a related art angle adjusting apparatus, a display device is adjusted only in a vertical direction and not in a back-and-forth direction. Also, it is frequently generated that a display device is detached from the angle adjusting apparatus by its own weight and is destroyed.

Also, various related art angle adjusting apparatuses have been separately manufactured for respective standards of display devices in order to easily support display devices brought to the market in variety of standards. Therefore, as standards of display devices are diversified, a variety of angle adjusting apparatuses should be manufactured separately.

SUMMARY OF THE INVENTION

Accordingly, the present invention is directed to a supporting apparatus for a display device that substantially obviates one or more problems due to limitations and disadvantages of the related art.

An object of the present invention is to provide a supporting apparatus for a display device, in which the weight of the supporting apparatus is minimized so that a viewer or a technician may easily install the supporting apparatus, and capable of mounting display devices of all standards brought to the market.

Another object of the present invention is to provide a supporting apparatus for a display device, allowing a user to easily adjust an angle of a heavy display device with small force.

A further another object of the present invention is to provide a supporting apparatus for a display device, allowing a viewer to adjust an angle of the display device in a vertical direction and a back-and-forth direction.

A still further another object of the present invention is to provide a supporting apparatus for a display device, capable of minimizing manufacturing costs by minimizing the number of parts used for manufacturing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a supporting apparatus for a display device, the supporting apparatus including: a hanger assembly allowing an upper side and a lower side of the display device to move back and forth with the display device fixed; and a supporter assembly on which the hanger assembly is mounted and whose horizontal width is controlled to adjust a position of the hanger assembly.

In another aspect of the present invention, there is provided a supporting apparatus for a display device, the supporting apparatus including: a hanger assembly for supporting the display device; and a supporter assembly, on both sides of which the hanger assembly is fixed, wherein the hanger assembly includes: a wall bracket fixed on the supporter assembly; a channel bracket for freely moving back and forth a predetermined distance from the wall bracket; a link member for connecting the wall bracket with the channel bracket; and a set bracket coupled to a front side of the channel bracket and to which the display device is coupled.

In a further another aspect of the present invention, there is provided a supporting apparatus for a display device, the supporting apparatus including: a pair of hanger assemblies mounted on both front sides of the display device, for adjusting a vertical angle of the display device; and a supporter assembly for controlling an interval between a pair of the hanger assemblies, wherein the supporter assembly includes: a pair of moving supporters mounted on a pair of the hanger assemblies, respectively; and a supporter guide for guiding the moving supporters such that the moving supporters move horizontally.

With such a construction, it is possible to adjust an angel of a display device in multi-direction and conveniently install display devices having various sizes by freely adjusting a width of a supporting apparatus depending on the size of the display devices.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
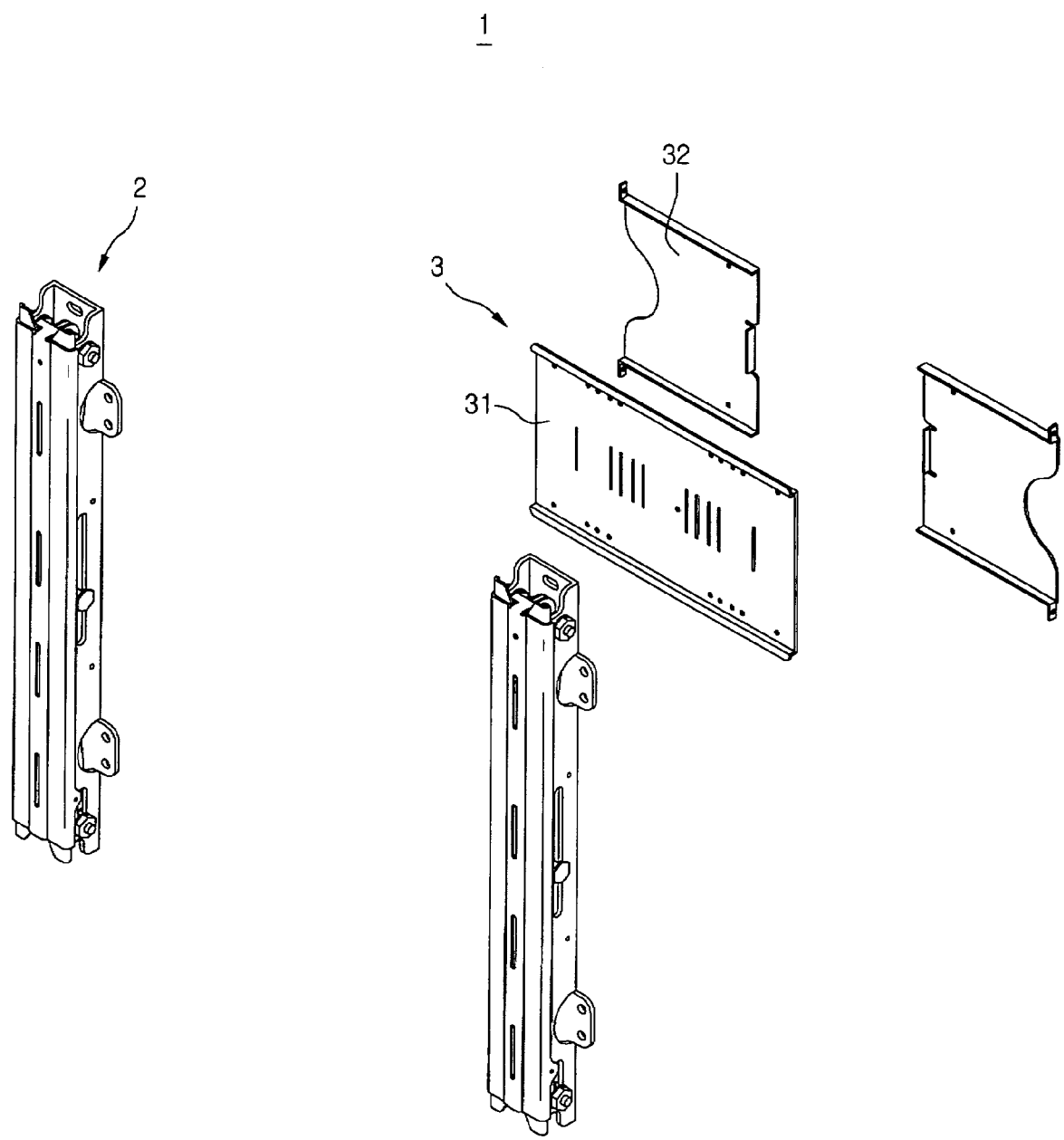
FIG. 1 is an exploded perspective view of a supporting apparatus for a display device according to the present invention.

FIG. 1 is an exploded perspective view of a supporting apparatus for a display device according to the present invention.

Referring to FIG. 1, the supporting apparatus 1 includes a pair of hanger assemblies 2 fixedly attached on a wall surface and allowing a display device to be mounted on a front side of the hanger assemblies 2, and a supporter assembly 3 having both ends coupled to lateral sides of a pair of the hanger assemblies 2 and adjusting the width of the hanger assemblies 2.

In detail, the supporter assembly 3 includes a supporter guide 31 of a predetermined standard and a moving supporter 32 mounted on the backside of the supporter guide 31 to move horizontally. Each of the hanger assemblies 2 is formed by assembling a plurality of parts to allow angle adjustment and movement vertically or back/forth direction, which will be described in detail later with reference to the accompanying drawings.

Respective elements constituting the supporting apparatus 1 will be described in detail below.

Figure 2:
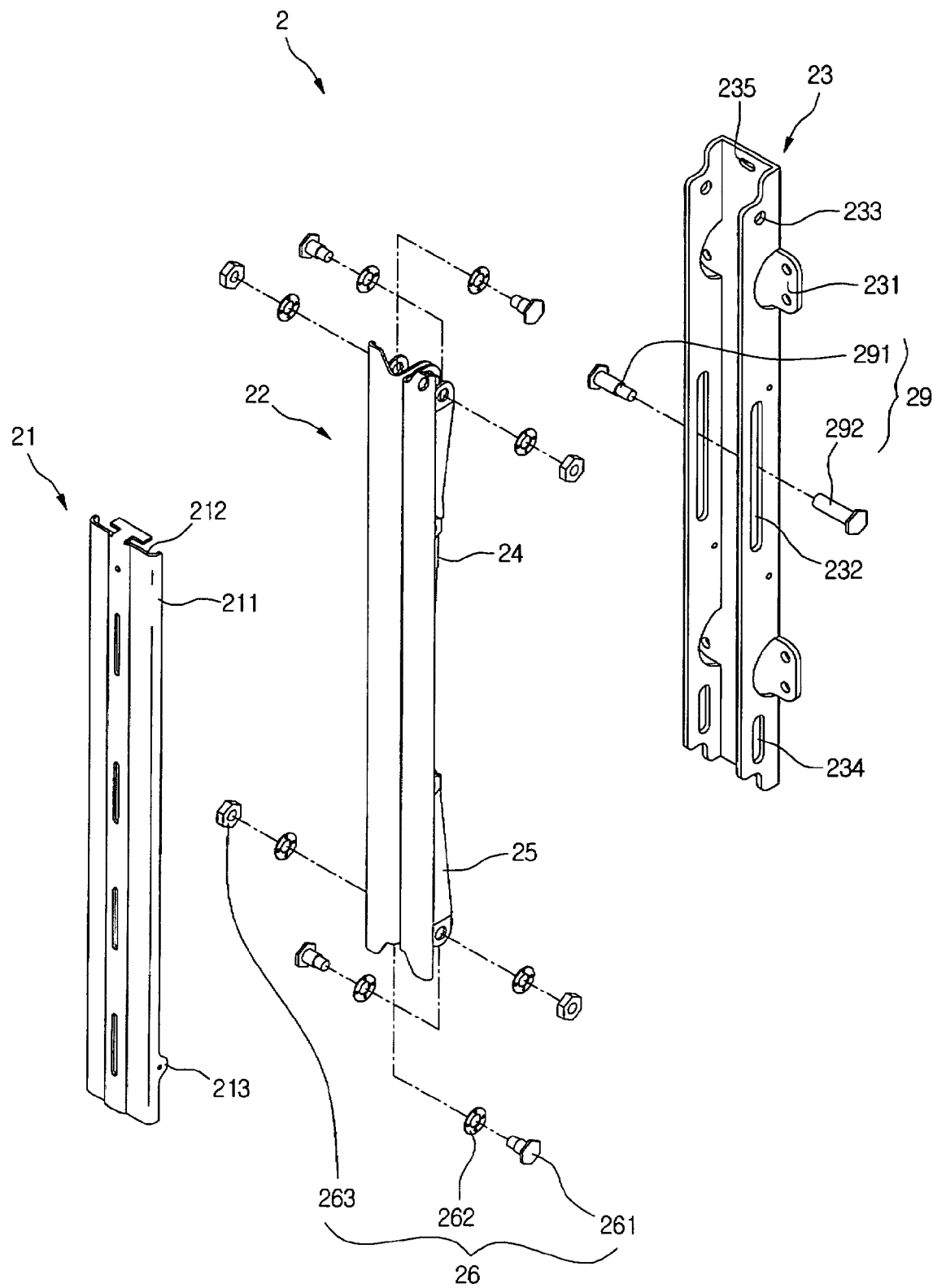
FIG. 2 is an exploded perspective view of a hanger assembly according to the present invention.

FIG. 2 is an exploded perspective view of a hanger assembly according to the present invention.

Referring to FIG. 2, the hanger assembly 2 includes: a wall bracket 23 attached on a wall surface; a channel bracket 22 rotatably mounted on the front side of the wall bracket 23; a set bracket 21 coupled to the front side of the channel bracket 22 in a sliding manner and on which a display device is mounted; an upper link 24 and a lower link 25 for connecting the wall bracket 23 with the channel bracket 22; and fastening members 26 for allowing the upper link 24 and the lower link 25 to be rotatably coupled to the wall bracket 23.

In detail, the wall bracket 23 includes a rectangular plate whose both ends are bent such that a cross-section of the rectangular plate forms a ".". shape. A rising hole 232 having a predetermined length is formed in the bent lateral side of the wall bracket 23 to allow a rising member 29 connecting the upper link 24 with the wall bracket 23 to move vertically. A coupling hole 233 allowing coupling of a link guide, which will be described later, of the upper link 24 is formed in the upper portion of the bent lateral side of the wall bracket 23. A coupling hole 234 allowing coupling of a link guide of the lower link 25 is formed in the lower portion of the bent lateral side of the wall bracket 23. At least one coupling hole 235 is formed in the front side of the wall bracket 23 to firmly fix the wall bracket 23 on the wall surface. Coupling ends 231 are formed in both sides of the wall bracket 23, respectively, to more reliably fix the wall bracket 23 on the wall surface. In detail, the coupling ends 231 are formed by cutting part of the wall bracket 23 in a predetermined size and bending the cut part with respect to a line passing through an edge of the wall bracket 23. Therefore, a cut hole corresponding to the size of the coupling ends 231 is formed in each of the bent lateral sides of the wall bracket 23.

Also, the set bracket 21 is formed by bending both lateral sides and an upper surface in predetermined widths. In detail, a guide surface 211 bent several times is formed on each of both lateral sides of the set bracket 21, and a coupling end 213 protrudes in a predetermined length at the lower end of the guide surface 211. The coupling end 213 includes a coupling hole having a predetermined diameter. A coupling member such as a screw passes through the coupling hole, thereby coupling the set bracket 21 to the channel bracket 22. A guide groove 212 having a shape bent in a predetermined angel is formed in the upper surface of the set bracket 21 to allow the channel bracket 22 to be inserted into the set bracket 21 in a sliding manner. A method of coupling the channel bracket 22 to the set bracket 21 will be described later.

Also, the fastening members 26 for coupling the upper and lower links 24 and 25 to the wall bracket 23 include a coupling bolt 261 passing through the coupling hole 234 formed in one of the bent later sides of the wall bracket 23, a coupling nut 263 coupled on the outer periphery of the coupling bolt 261, and a washer 262 fitted between the coupling bolt 261 and the coupling nut 263.

Also, the rising member 29 includes a rising bolt 292 having an end whose outer periphery is threaded in a predetermined length, and a rising nut 291 having a nut portion for receiving the threaded portion formed in the rising bolt 292.

With the above-described construction, when a viewer adjusts an angle of a display device mounted on the front side of the set bracket 21 vertically or back and forth direction, the channel bracket 22 rotates clockwise or counterclockwise, or in the back and forth direction with respect to the wall bracket 23. Also, the rising member 29 connecting the upper link 24 with the wall bracket 23 moves vertically along the rising hole 232 as the channel bracket 22 moves.

Figure 3:
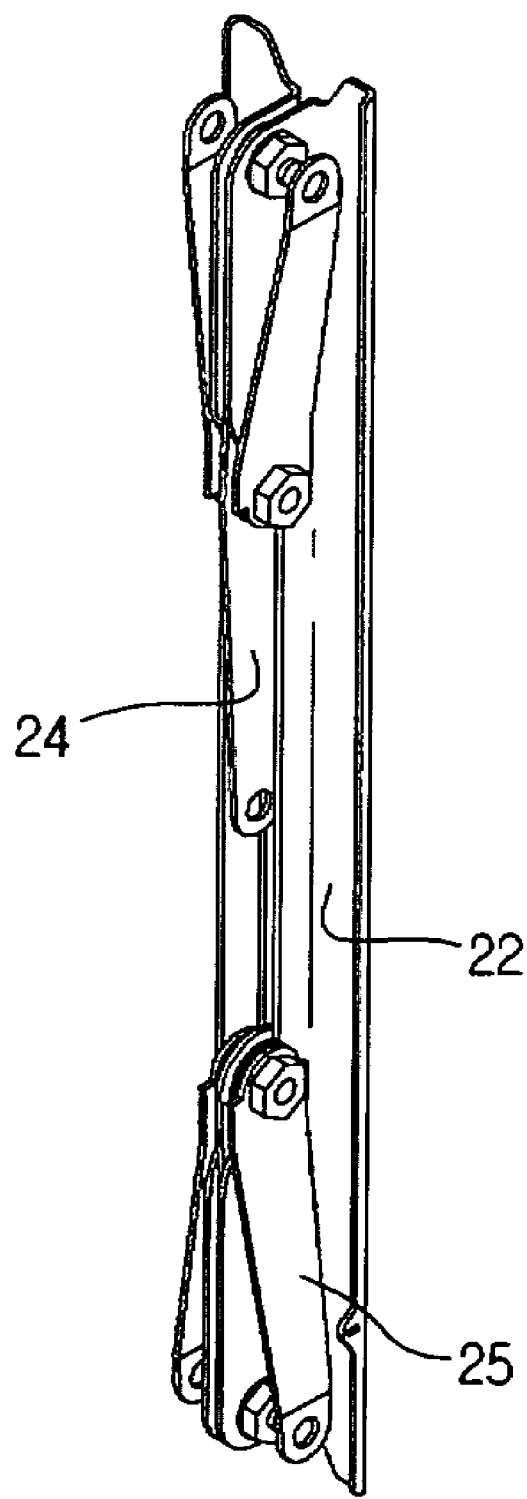
FIG. 3 is a perspective view illustrating an upper link and a lower link are coupled to a channel bracket according to the present invention.
Figure 4:
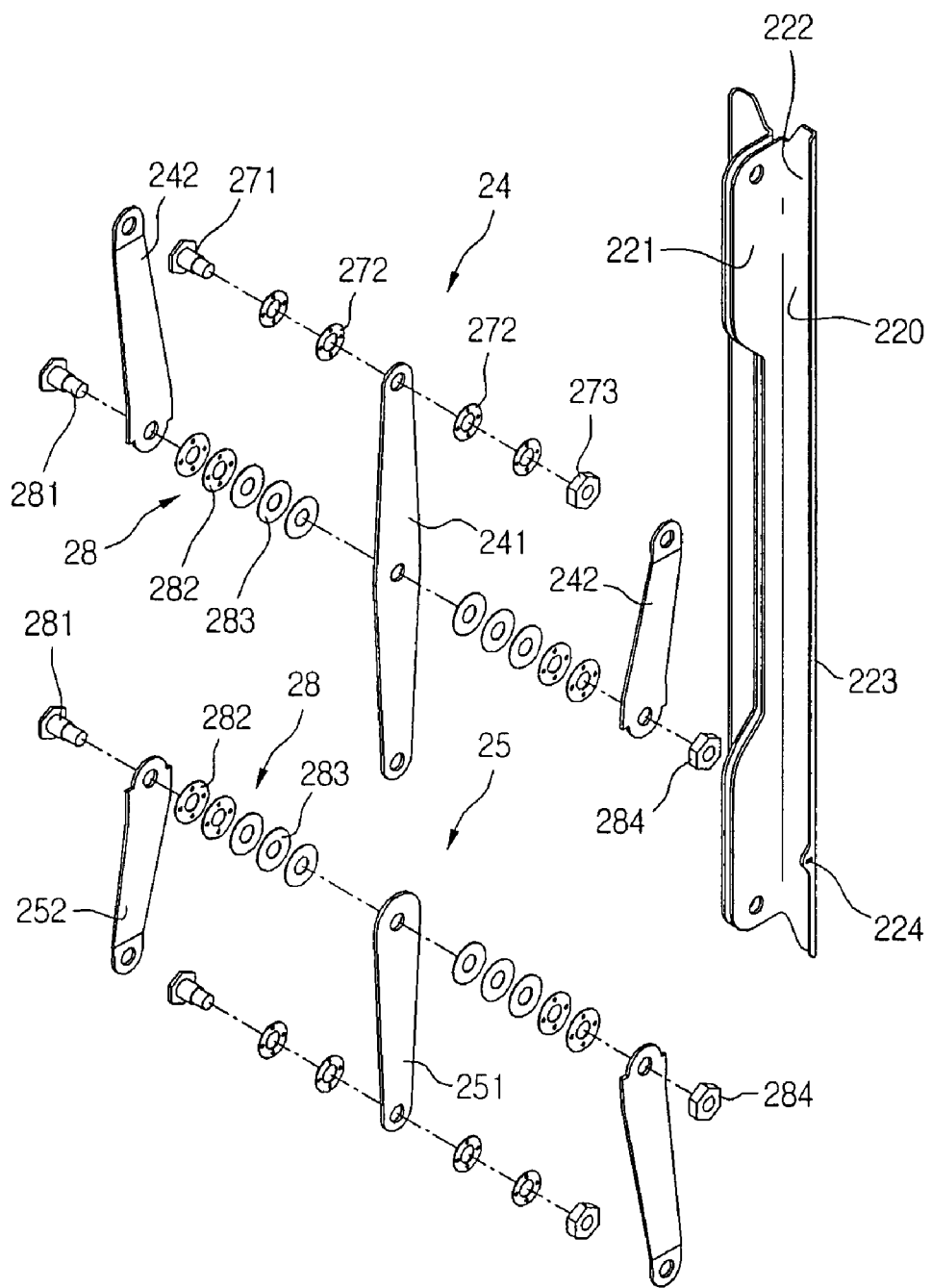
FIG. 4 is an exploded perspective view of a channel bracket, an upper link, and a lower link.

FIG. 3 is a perspective view illustrating an upper link and a lower link are coupled to a channel bracket according to the present invention, and FIG. 4 is an exploded perspective view of a channel bracket, an upper link, and a lower link.

Referring to FIGS. 3 and 4, the channel bracket 22 is rotatably connected to the wall bracket 23 using the upper and lower links 24 and 25.

In detail, the channel bracket 22 includes a pair of moving brackets 220 arranged to be symmetrical to each other and forming the same shape. Also, part of the upper and lower links 24 and 25 is inserted to a portion where the moving brackets 220 contact each other, and a pair of the moving brackets 220 are integrally coupled to the upper and lower links 24 and 25 through the coupling member 28.

In more detail, the moving brackets 220 constituting the channel bracket 22 includes a link coupling end 221 having one side bent in a predetermined width, a slider 222 having one end bent in a predetermined width, and a coupling end 224 protruding at the lower end of the slider 222 to couple to the coupling end 213 (of FIG. 2) of the set bracket 21. A coupling hole is formed in the link coupling end 221, and the upper and lower links 24 and 25 are connected with the channel bracket 22 through the coupling member passing through the coupling hole. Also, the set bracket 21 is seated on the front side of a pair of the moving brackets 220, so that the moving brackets 220 are integrally coupled to each other.

Also, the upper link 24 coupled to the upper portion of the channel bracket 22 includes an upper center link 241 formed in a predetermined length and having both ends in each of which a coupling hole is formed, and two link guides 242 coupled to both sides of the upper center link 241 and having one end rotatably coupled to a central portion of the upper center link 241. In detail, the link guides 242 and the upper center link 241 are coupled to each other through the coupling member 28. Also, the coupling member 28 includes a plurality of spacers 282 and spring washers 283 inserted between one end of the link guides 242 and the upper center link 241, a coupling bolt 281 passing through the upper center link 241, the link guides 242, the spacers 282, and the spring washers 283, and a coupling nut 284 fitted on the outer periphery of the coupling bolt 281. Here, the spacers 282 and the spring washers 283 intervening between the link guides 242 and the upper center link 241 minimize abrasion of a coupling portion. It is possible to control rotational force of the link guide 242 by controlling fastening degree of the coupling bolt 281. The rotational force is appropriately determined by the weight of a display device mounted.

In more detail, the other end of the link guides 242 is rotatably coupled to the moving brackets 220 constituting the channel bracket 22. Also, one end of the upper center link 241 is inserted into a portion where the link coupling ends 221 of the moving bracket 220 contacts each other. One end of the upper center link 241, and the link coupling end 221 of the moving bracket 220 are integrally coupled through a coupling member 27. In other words, One end of the upper center link 241 is connected with the link coupling end 221 of the moving bracket 220, and the one end of the upper center link 241 is inserted between the link coupling ends 221. Also, the coupling member 27 is inserted into coupling holes formed in the upper portion of the link coupling ends 221, and the end of the upper center link 241. Here, the coupling member 27 includes a coupling bolt 271 passing through the upper center link 241, and the link coupling ends 221, and a washer 272 fitted on the upper center link 241 and the end of the upper center link 241, for reducing friction force, and a nut 273 fitted on the outer periphery of the coupling bolt 271.

Also, the other side of the upper center link 241 moves vertically along a rising hole 232 formed in each of bent lateral sides of the wall bracket 23 through the rising member 29. In detail, the rising nut 291 and the rising bolt 292 passes through the coupling hole formed in the end of the upper center link 241 and the rising hole 232 to allow the other end of the upper center link 241 to be movably coupled to the wall bracket 23.

Also, the lower link 25 for connecting a lower end of the channel bracket 22 with the wall bracket 23 includes a lower center link 251 and two link guides 252 coupled to both sides of the lower center link 251.

In detail, coupling holes are formed in both sides of the link guides 252 and the lower center link 251 so that a coupling member may pass therethrough. Also, one end of the link guides 252 is rotatably coupled to one end of the lower center link 251 using the coupling member 28. Also, the other ends of the link guides 252 are coupled to the bent sides of the wall bracket 23, respectively. The other end of the lower center link 251 is rotatably coupled to the channel bracket 22 through the coupling member 27. Here, the lower center link 251 is coupled to the channel bracket 22 in the same way as one end of the upper center link is coupled to the channel bracket 22.

The way in which the coupling member 28 intervenes between lower center link 251 and the link guide 252 is the same as the way in which the coupling member 28 intervenes between the upper center link 241 and the link guides 242 of the upper link 24.

Figure 5:
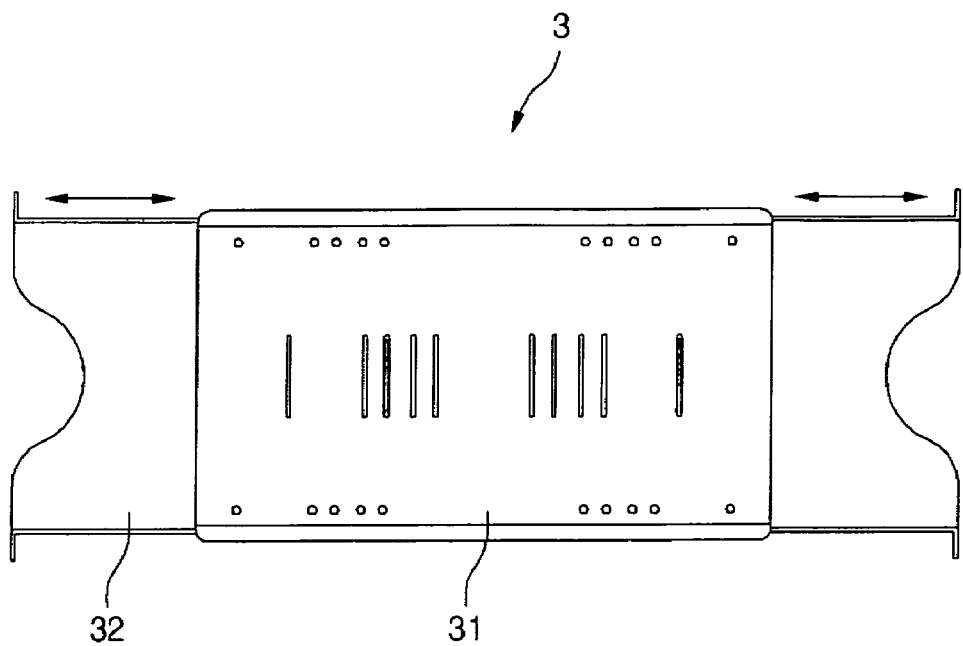
FIG. 5 is a perspective view of a supporter assembly according to the present invention.
Figure 6:
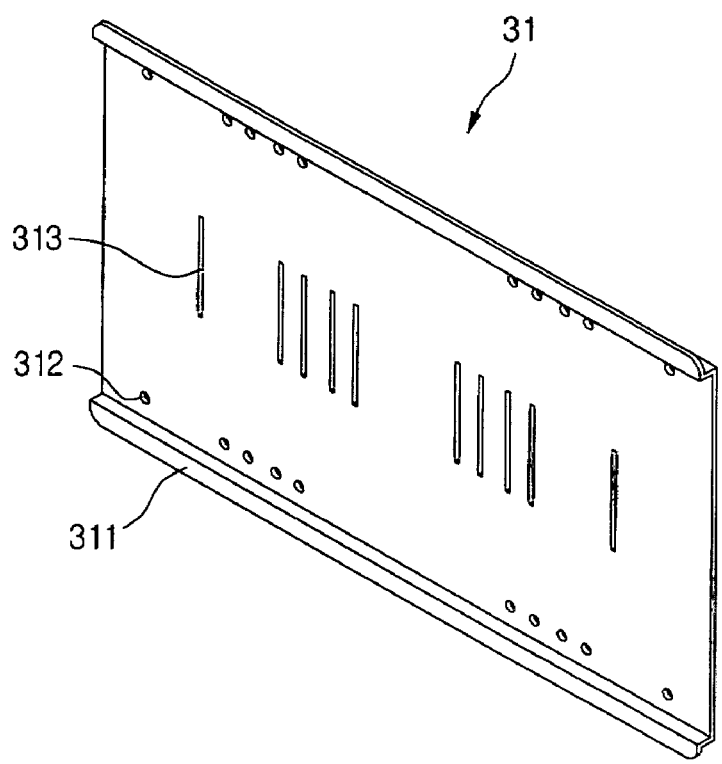
FIG. 6 is a perspective view of a supporter guide according to the present invention.
Figure 7:
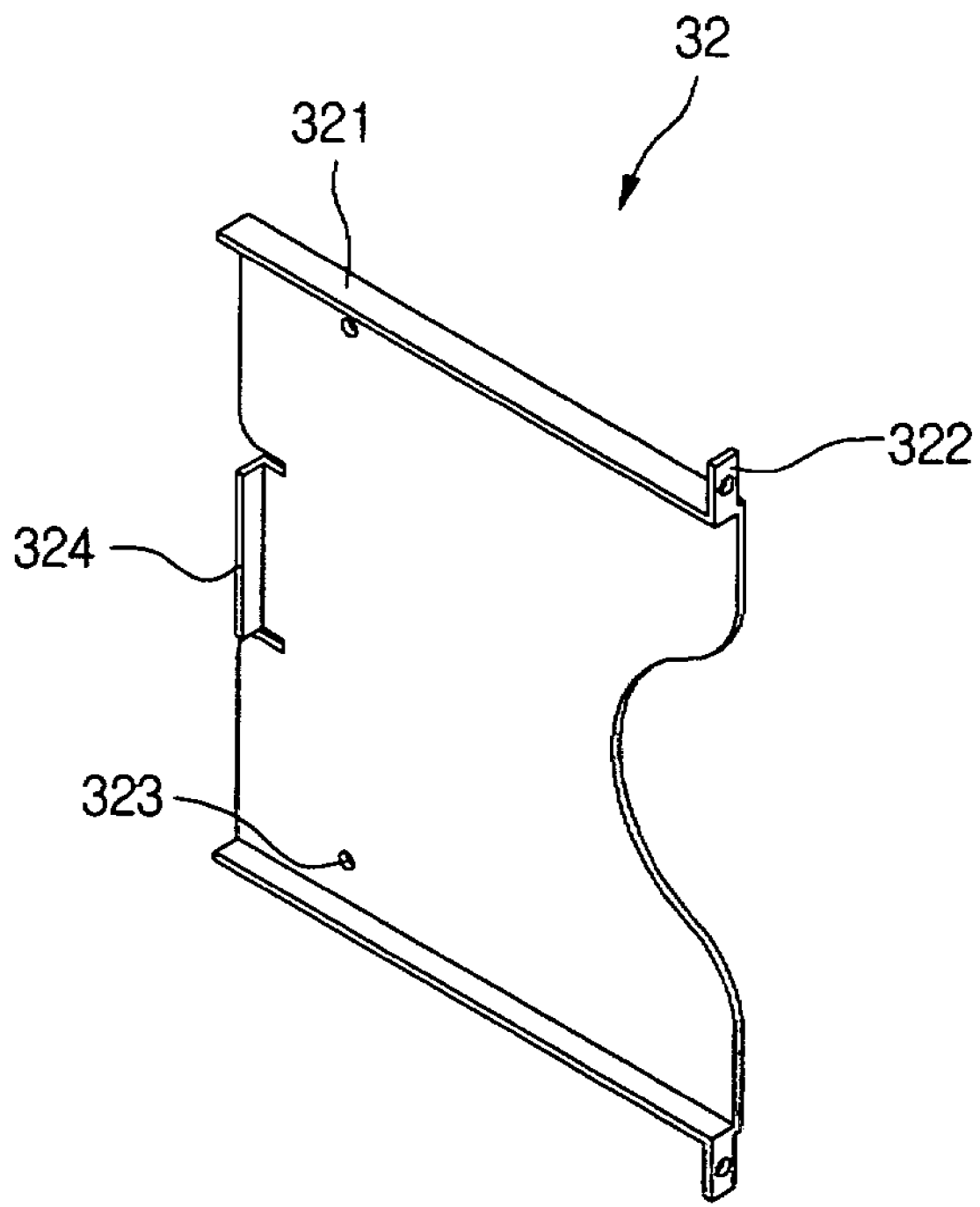
FIG. 7 is a perspective view of a moving supporter constituting a supporter assembly.

FIG. 5 is a perspective view of a supporter assembly according to the present invention, FIG. 6 is a perspective view of a supporter guide according to the present invention, and FIG. 7 is a perspective view of a moving supporter constituting a supporter assembly.

Referring to FIGS. 5 and 7, the supporter assembly 3 includes a supporter guide 31 and moving supporters 32. Both ends of the moving supporters 32 are coupled to the hanger assembly 2.

In detail, two moving supporters 32 are mounted on the backside of the supporter guide 31 and movable horizontally along the supporter guide 31. Therefore, it is possible to appropriately control the width of the hanger assembly 2 depending on a standard of a display device mounted by allowing the moving supporters 32 to be drawn out toward both ends of the supporter guide 31, or to contract toward the inner side of the supporter guide 31.

In more detail, the support guide 31 has an approximately rectangular shape and includes: guides 311 formed by bending an upper end and a lower end of the support guide 31 at least one time; fixing holes 312 formed at a constant interval along the upper and lower portions; and a slot 313 formed at a predetermined length with a constant interval in the central portion.

Also, each of the moving supporters 32 includes a slider 321 formed by bending an upper portion and a lower portion of the moving supporters 32 at a predetermined angle, hanger coupling ends 322 having one end vertically bent, for being attached on the wall bracket 23, an interval control rib 324 formed by bending the other side of the moving supports 32 in a predetermined length, for being inserted into the slot 313, and fixing holes 323 symmetrically formed in the upper and lower sides of the moving supporters 32.

In detail, a coupling member or a fixing pin is inserted into the fixing holes 323 formed in the moving supporter 32 and the fixing holes 312 formed in the supporter guide 31, and the interval control rib 324 is inserted into the slot 313, so that the moving supporters 32 are fixed in the supporter guide 31.

In more detail, the slider 321 of each moving supporters 32 face-contacts the guide 311 of the supporter guide 31 and slides horizontally.

Figure 8:
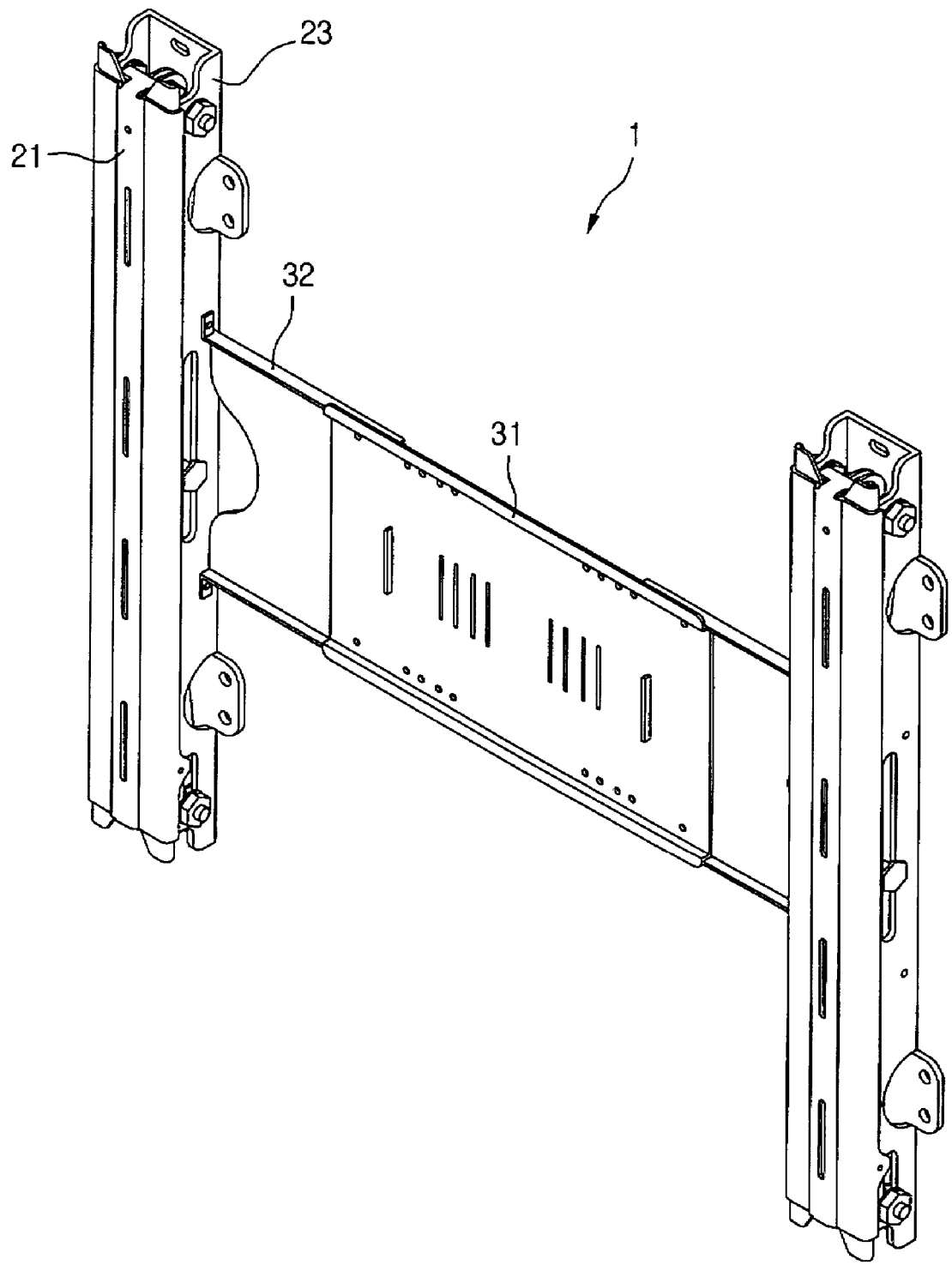
FIG. 8 is a perspective view of a supporting apparatus when a display device is closely attached on a wall surface.
Figure 9:
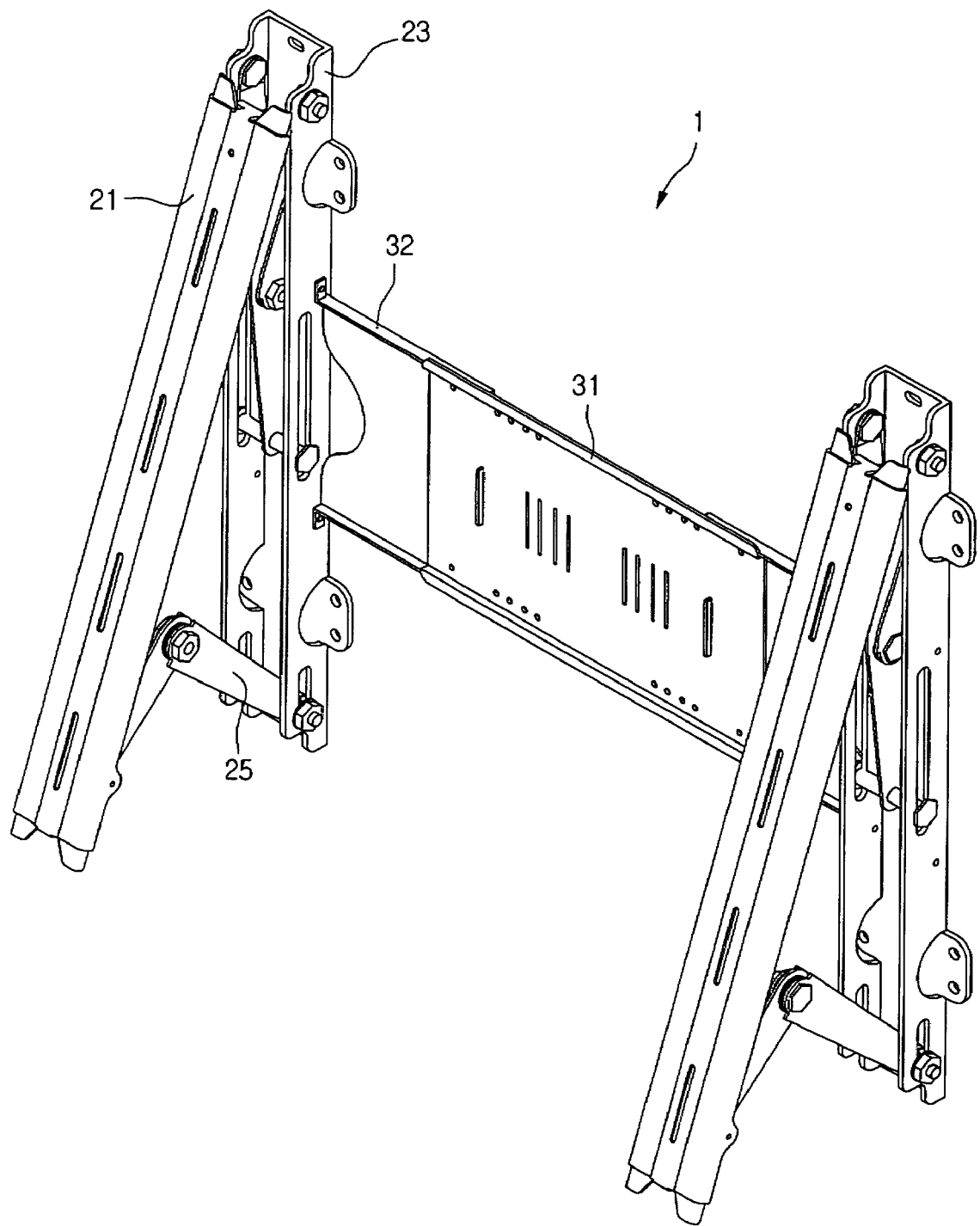
FIG. 9 is a perspective view of a supporting apparatus when a display device is tilted upward.
Figure 10:
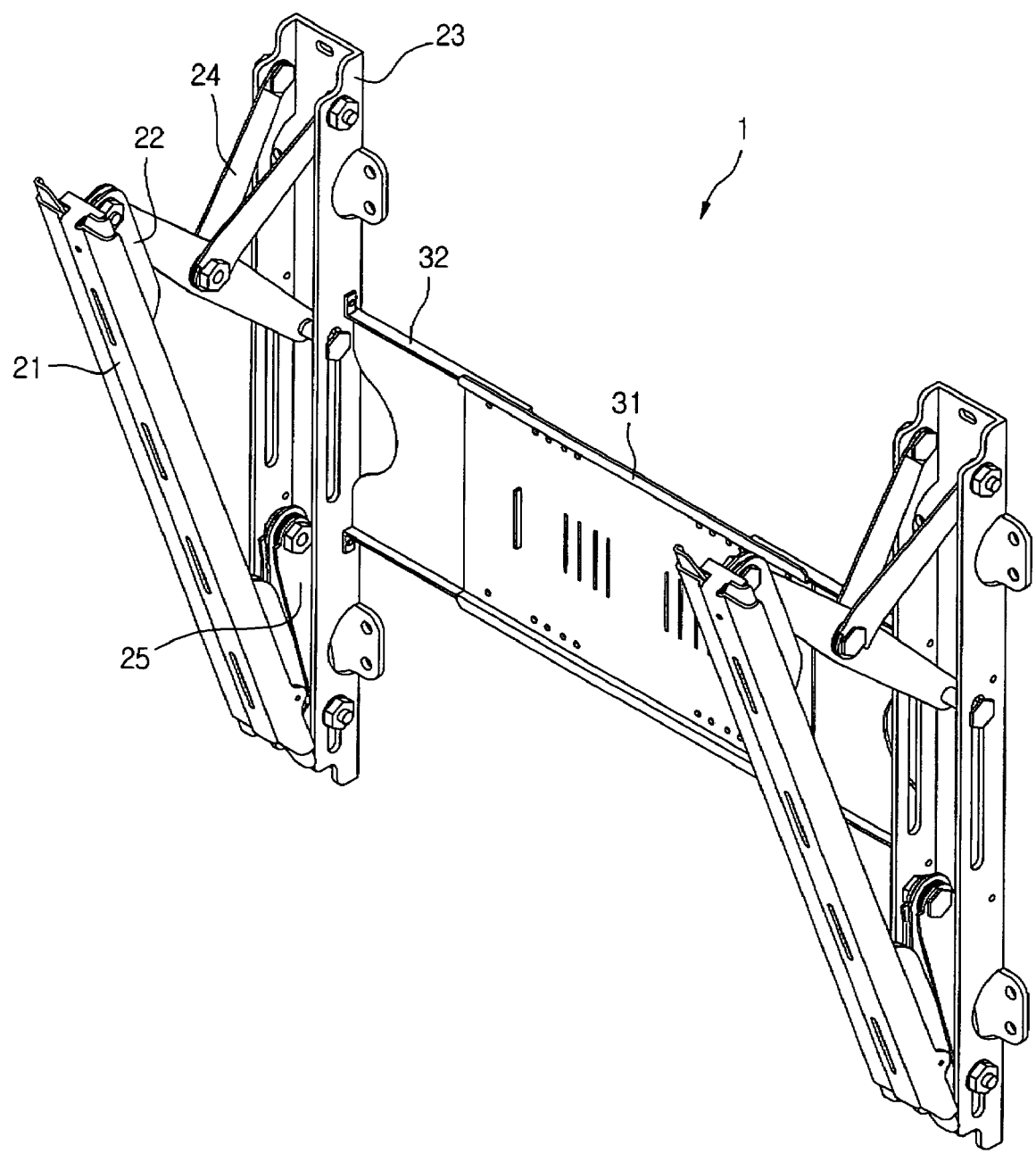
FIG. 10 is a perspective view of a supporting apparatus when a display device is tilted downward.
Figure 11:
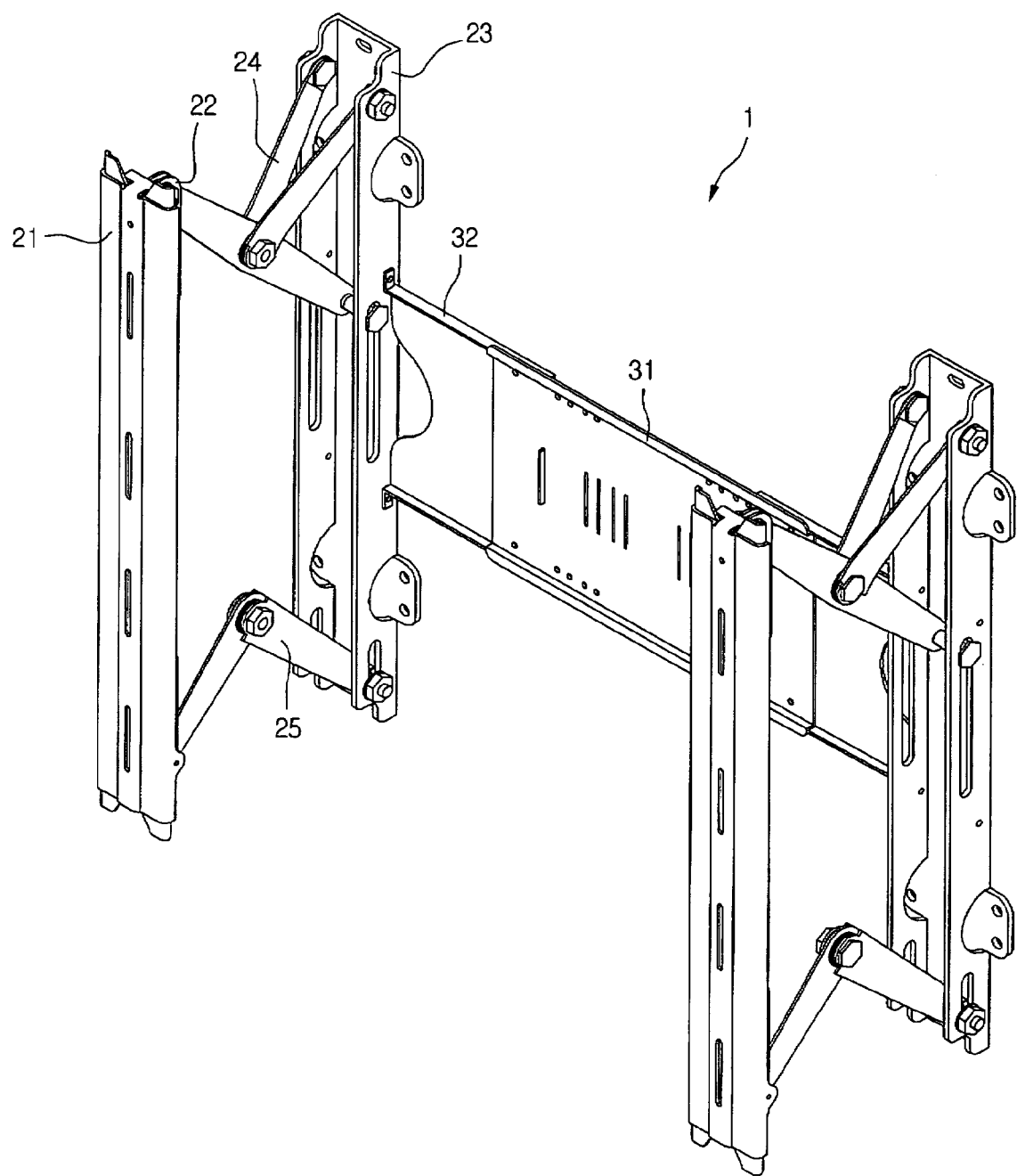
FIG. 11 is a perspective view of a supporting apparatus when a display device is disposed a predetermined distance to the front from a wall surface.

FIG. 8 is a perspective view of a supporting apparatus when a display device is closely attached on a wall surface, FIG. 9 is a perspective view of a supporting apparatus when a display device is tilted upward, FIG. 10 is a perspective view of a supporting apparatus when a display device is tilted downward, and FIG. 11 is a perspective view of a supporting apparatus when a display device is disposed a predetermined distance to the front from a wall surface.

Referring to FIGS. 8 and 9, the supporting apparatus according to the present invention allows the hanger assembly 2 to be appropriately transformed depending on a tilt state of a display device.

In detail, it is possible to maintain an interval of the hanger assembly 2 by adjusting the width of the supporter assembly 3 suitably for a standard of a display device before the display device is mounted in the supporting apparatus 1.

When a viewer presses a display device toward a wall in order to completely attach the display device on the wall surface, the channel bracket 22 is completely attached inside the wall bracket 23. Then, the front side of the set bracket 21 becomes approximately the same height as that of the bent lateral sides of the wall bracket 23.

Also, the lower end of the display device is rotated upward in order to allow the display device to maintain a position rotated upward at a predetermined angle. Then, the channel bracket 22 is obliquely rotated at a predetermined angle, and the lower link 25 spreads a predetermined angle. That is, a space between the link guides 252 and the lower center link 251 of the lower link 25 is widened a predetermined angle. Here, friction force generated at a coupling portion between the lower center link 251 and the link guides 252 may be appropriately controlled by fastening force of the coupling member. In other words, the friction force generated at the lower link 25 should be at least equal to or greater than moment generated by the weight of a display device in order to allow the display device to maintain a state tilted upward.

Also, the upper end of the display device is rotated in order to allow the display device to maintain a state rotated downward at a predetermined angle. Then, the channel bracket 22 is obliquely rotated at a predetermined angle, and the upper center link 241 and the link guides 242 of the upper link 24 spread at a predetermined angle.

In detail, the end of the upper center link 241 that is connected with the rising hole 232 of the wall bracket 23 rises along the rising hole 232. Also, the link guides 242 rotate clockwise around a point where the link guides 242 are coupled to the wall bracket 23. The display device rotates downward until the rising member 29 coupled to the upper center link 241 contacts the upper end of the rising hole 232.

Here, appropriate control of friction force generated at a point where the upper center link 241 is coupled to the link guides 242 by controlling fastening force of the coupling member 28 may prevent the display device from rotating to the front by itself due to its own weight. In other words, the friction force generated between the upper center link 241 and the link guides 242 should be at least equal to or greater than moment generated by the weight of the display device in order to allow the display device to maintain a state rotated at an angle desired by a viewer.

Also, a viewer pulls the display device in order to separate the display device a predetermined distance from a wall surface. Then, the channel bracket 22 moves to the front in a vertical state.

In detail, the end of the upper center link 241 of the upper link 24 rises along the rising hole 232, and simultaneously, the lower center link 251 and the link guides 252 of the lower link 25 spread a predetermined angle.

As is apparent from the above descriptions, a viewer may freely and sufficiently manipulate an angle of a display device with small force.

According to a supporting apparatus for a display device having the above-described construction, a viewer or a technician may easily install the supporting apparatus, and display devices of all standards brought to the market may be mounted on the supporting apparatus.

Also, a viewer may easily adjust an angle of a heavy display device with small force.

Also, an angle of a display device may be adjusted vertically and back-and-forth direction, and a display device is not hung down by its own weight or not detached from a supporting apparatus even when the display device protrudes to the front.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A supporting apparatus for a display device, the supporting apparatus comprising:
    at least two hanger assemblies allowing an upper side and a lower side of the display device to move back and forth with the display device fixed; and
    a supporter assembly being retractable, on which the at least two hanger assemblies are mounted respectively and whose horizontal width is controlled to adjust an interval between the at least two hanger assemblies depending on the size of the display device,
    wherein the at least one of the at least two hanger assemblies comprises:
        a wall bracket fixed in a fixing part;
        a channel bracket rotatably connected with the wall bracket and/or spaced a predetermined distance from the wall bracket;
        a link member for connecting the wall bracket with the channel bracket; and
        a set bracket coupled to the channel bracket, and a front side of which the display device is mounted, and
    wherein the link member comprises:
        a center link having one end moving along a lengthwise direction of the wall bracket, and the other end connected with the channel bracket; and
        at least one link guide having one end connected with the center link and the other end connected with the wall bracket to guide an operation of the center link.

2. The apparatus according to claim 1, wherein the link member comprises:
    an upper link having one end risibly mounted on an upper portion of the wall bracket, and a lower portion connected with an upper portion of the channel bracket; and
    a lower link for connecting a lower portion of the wall bracket with a lower portion of the channel bracket.

3. The apparatus according to claim 1, wherein the channel bracket comprises two bracket members facing each other and coupled to the set bracket.

4. The apparatus according to claim 1, wherein the set bracket is slid and inserted in the front side of the channel bracket.

5. The apparatus according to claim 1, wherein the set bracket is coupled to the channel bracket using a separate coupling member.

6. The apparatus according to claim 1, wherein the supporter assembly comprises:
    a supporter guide; and
    a moving supporter coupled to the hanger assembly and moving in a horizontal direction of the supporter guide.

7. The apparatus according to claim 6, wherein movements of the moving supporter and the supporter guide are relatively guided by a bending portion formed at each edge of the moving supporter and the supporter guide.

8. The apparatus according to claim 6, wherein the moving supporter is coupled to an inner side of the hanger assembly.

9. The apparatus according to claim 6, wherein the moving supporter is moved in a horizontal direction of the supporter guide up to a position where the display device is coupled to the hanger assembly.

10. A supporting apparatus for a display device, the supporting apparatus comprising:
    a hanger assembly for supporting the display device; and
    a supporter assembly, to which the hanger assembly is fixed, wherein the hanger assembly includes:

a wall bracket fixed on the supporter assembly;

a channel bracket for freely moving back and forth a predetermined distance from the wall bracket;

a link member for connecting the wall bracket with the channel bracket; and a set bracket coupled to a front side of the channel bracket and to which the display device is coupled, wherein the link member comprises:

a center link having one end moving along a lengthwise direction of the wall bracket, and the other end connected with the channel bracket; and at least one link guide having one end connected with the center link and the other end connected with the wall bracket to guide an operation of the center link.

11. The apparatus according to claim 10, wherein an upper portion and a lower portion of the channel bracket are moved back and forth independently.

12. The apparatus according to claim 10, wherein the link member comprises:

a link guide having one end connected with the wall bracket; and a lower link having one end connected with the channel bracket, wherein the lower link and the wall bracket are hinge-coupled to each other.

13. The apparatus according to claim 10, wherein the link member comprises:

a first link member for connecting an upper portion of the wall bracket with an upper portion of the channel bracket; and a second link member for connecting a lower portion of the wall bracket with a lower portion of the channel bracket.

14. The apparatus according to claim 13, wherein the first link member and the second link member operate in different manners.

15. The apparatus according to claim 13, wherein friction force generated at the first link member and the second link member is adjustable.

16. A supporting apparatus for a display device, the supporting apparatus comprising:

a pair of hanger assemblies whose front sides are mounted on the display device, for adjusting a vertical angle of the display device; and a supporter assembly being retractable for controlling an interval between a pair of the hanger assemblies depending on the size of the display device, wherein the supporter assembly includes:

a pair of moving supporters mounted on a pair of the hanger assemblies, respectively;

a supporter guide for guiding the moving supporters such that the moving supporters move horizontally;

a slider formed by bending an upper end and/or a lower end of the moving supporters at least one time; and a guide bent at least one time at a position of the supporter guide that corresponds to the slider and on which the slider is seated.

17. The apparatus according to claim 16, wherein the supporter guide collectively supports a pair of the moving supporters using a single body.

18. The apparatus according to claim 16, further comprising:

an interval control part formed on one side of the moving supporters; and at least two slots formed in the supporter guide, for selectively receiving the interval control part to fix a movement position of the moving supporters.

19. The apparatus according to claim 16, further comprising at least one fixing hole formed in the moving supporters and the supporter guide, and through which a fixing member passes to allow the moving supporters to be fixed in the supporter guide.

* * * * *